United States Patent [19] [11] 4,170,381
Helm [45] Oct. 9, 1979

[54] UNIVERSAL MOUNT WIND DEFLECTOR AND METHOD OF MOUNTING

[76] Inventor: Frederick A. Helm, 2900 E. Jefferson, Detroit, Mich. 48207

[21] Appl. No.: 818,514

[22] Filed: Jul. 25, 1977

[51] Int. Cl.² ............................................. B60J 1/20
[52] U.S. Cl. .................................... 296/91; 296/137 J
[58] Field of Search ........................ 296/91, 1 S, 137 J

[56] References Cited
U.S. PATENT DOCUMENTS

| | | | |
|---|---|---|---|
| 3,072,431 | 1/1963 | Shumaker | 296/91 X |
| 3,089,728 | 5/1963 | Shumaker | 296/91 |
| 3,097,882 | 7/1963 | Andrews | 296/91 |
| 3,647,257 | 3/1972 | Litchfield | 296/91 |
| 3,904,239 | 9/1975 | Jardin | 296/91 X |
| 3,960,402 | 6/1976 | Keck | 296/1 S |

Primary Examiner—Joseph F. Peters, Jr.
Assistant Examiner—Gene A. Church
Attorney, Agent, or Firm—Barnes, Kisselle, Raisch & Choate

[57] ABSTRACT

A wind deflector construction including a wind deflector, a base bracket and a wind deflector bracket. The base bracket and wind deflector bracket are provided with a plurality of openings that can be selectively aligned to adjust the wind deflector in a plurality of positions to accommodate the contours of the automotive vehicle. According to the method of adjustment, after the base bracket is mounted on the vehicle, a template is mounted on the deflector and a portion of the template extends along the window of the automotive vehicle. This latter portion is arranged so that it is parallel to the window and then the final adjustment is completed by fastening the base bracket and wind deflector bracket in the adjusted positions relative to one another.

3 Claims, 6 Drawing Figures

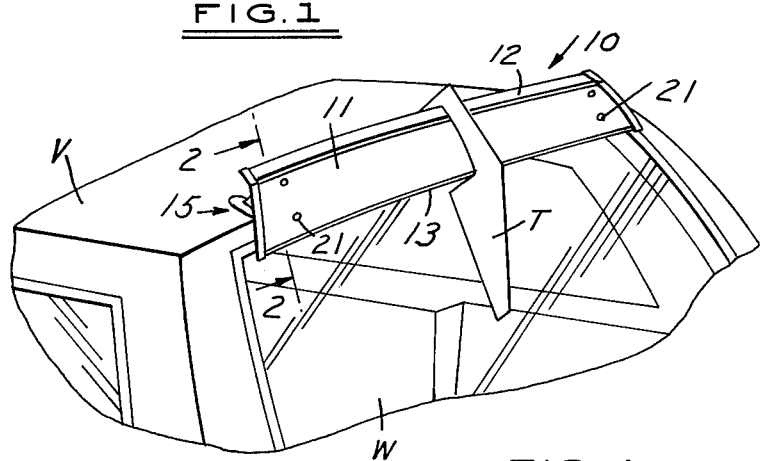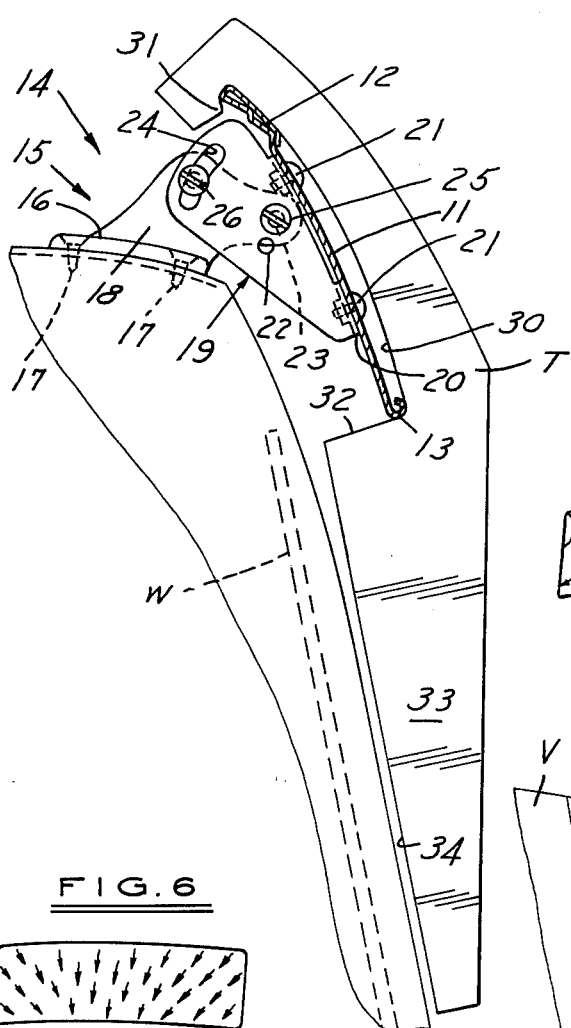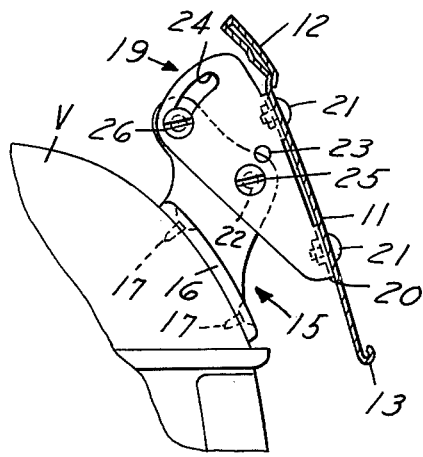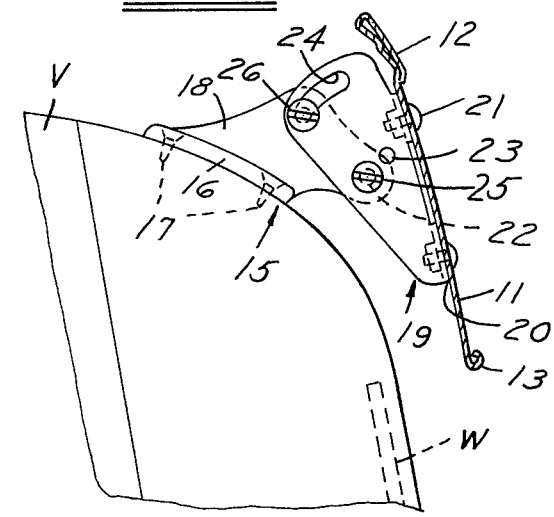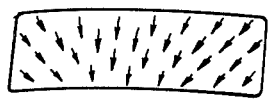

UNIVERSAL MOUNT WIND DEFLECTOR AND METHOD OF MOUNTING

This invention relates to wind deflectors for automotive vehicles.

BACKGROUND AND SUMMARY OF THE INVENTION

It has long been established that it is very desirable in automotive vehicles such as station wagons and vans that a wind deflector should be utilized in connection with the rear windows in order to prevent the accumulation of dirt and the like normally occurring thereon. The wind deflector must be mounted in a predetermined relationship to the window and the vehicle in order to obtain proper operation. Heretofore, the wind deflector and its mounting structure have been designed particularly for each vehicle.

The present invention is directed to a universally mounted wind deflector which can be utilized on a variety of vehicles having different configurations and to a method of adjusting the wind deflector in order to obtain the proper position relative to the automotive vehicle.

Basically, the wind deflector embodying the invention comprises the wind deflector blade, a base bracket, and a blade bracket with selectively adjusted positions permitted by the relative connections of the base bracket and blade bracket. A template is provided and removably mounted on the blade so that a portion of the template extends parallel to the window of the vehicle and when this condition is reached, the adjusted positions of the base bracket and blade bracket are secured by fasteners.

DESCRIPTION OF THE DRAWINGS

FIG. 1 is a fragmentary perspective view of a vehicle having the wind deflector embodying the invention thereon;

FIG. 2 is a sectional view on an enlarged scale taken along the line 2—2 in FIG. 1;

FIG. 3 is a view similar to FIG. 2 showing the wind deflector mounted on a different vehicle;

FIG. 4 is a view similar to FIG. 3 showing the wind deflector mounted on the still further vehicle;

FIG. 5 is a diagram showing air flow when a wind deflector is improperly adjusted;

FIG. 6 is a diagram showing air flow when a wind deflector is properly adjusted.

DESCRIPTION

Referring to FIG. 1, the wind deflector 10 comprises a wind deflector blade 11 which is adjustably mounted on a vehicle V as presently described in order to deflect the air downwardly along a window W along the rear of the vehicle.

As shown in FIG. 2, the wind deflector 11 may be made of sheet metal having a rolled over portion 12 along the upper edge and a bead 13 along the lower edge. The cross sectional contour of the deflector 11 is such that it is slightly curved in order to deflect the air downwardly along the surface of window W.

An adjustable mounting structure 14 is provided between the deflector blade 11 and the vehicle and includes a base bracket 15 which in turn has a base portion 16 through which screw 17 extends to fasten the base bracket to the vehicle and an upright portion 18. The upright portion 18 has spaced openings as presently indicated. A blade bracket 19 is provided on the blade and includes tabs 20 through which nut bolts 21 extend to fasten the blade bracket 19 to the wind deflector blade 11. The blade bracket includes two closely spaced openings 22, 23 and an arcuate slot 24 that has a sufficient width so that when a bolt and nut 25 are provided, for example, through opening 23 or/and a nut and bolt 26 are provided through slot 24 and one of the openings in the base 15, swinging or pivotal movement of the blade 11 can be achieved in either of the forementioned positions.

The above described construction permits the deflector blade 11 to be supported on the vehicle in a plurality of adjustable positions. For example, with the bolts 23, 26 as shown in FIG. 2, the deflector blade can be adjusted readily within a predetermined range determined by the arcuate slot 24. A different adjustment can be provided by placing the nut and bolt 25 through the opening 22 as indicated in FIG. 3.

Further adjustment can be achieved by reversing the base 15 and bracket 19 as shown, for example, in FIG. 4 wherein the base bracket 15 has been rotated 180° as contrasted to FIG. 6. In this relative arrangement of the base bracket and blade bracket, there are two ranges of adjustment depending upon whether the bolt 25 is through hole 22 and 23.

Further in accordance with the invention, in order to permit the purchaser to readily adjust the wind deflector with respect to his particular vehicle, a template T is provided that can be removably mounted on the blade and has an opening 30 with sides 31, 32 corresponding to the width of the deflector blade 11. The template T is hooked on the blade preferably at its center and has a portion 33 that extends along the window with an edge 34. The edge 34 is selected so that it is in a predetermined orientation to the blade 11 and when the blade 11 is properly adjusted, the edge 34 is parallel to the window W.

Thus in practice, the user mounts the brackets 15 on the vehicle with the nut and bolt assemblies 25, 26 loosely positioned, adjust the angle of the deflector blade 11, with the templates T in position so that the edge 34 is parallel to the window W, and then tightens the nut, lock washer and bolt assemblies 25, 26. In this manner, base bracket 18 and blade bracket 19 are locked together and proper adjustment of the position of the blade is achieved to produce maximum cleaning efficiency. When a wind deflector is improperly adjusted air does not flow properly to clear the rear window, as shown diagrammatically in FIG. 5 whereas when the wind deflector is adjusted properly, the air flows in the manner indicated to clear the window, as shown in FIG. 1.

I claim:
1. A wind deflector comprising,
   a wind deflector blade adapted to extend along the rear of a vehicle,
   at least one base bracket adapted to be mounted on a vehicle,
   at least one blade bracket adapted to be mounted on the wind deflector blade,
   and adjustable means between the base bracket and blade bracket for changing the angular relationship of the wind deflector blade with respect to the vehicle,
   a removable template mounted on said deflector blade and having an edge portion thereof extending in predetermined relationship along the window of the vehicle such that when the template is mounted on the deflector, the deflector can be adjusted to bring the edge portion into predetermined relation to the window of the vehicle and thereby establish the proper relationship of the deflector to the window after which the template can be removed.

2. A wind deflector comprising
a wind deflector blade adapted to extend along the rear of a vehicle,
at least one base bracket adapted to be mounted on a vehicle,
at least one blade bracket adapted to be mounted on the wind deflector blade,
and adjustable means between the base bracket and blade bracket for changing the angular relationship of the wind deflector blade with respect to the vehicle,
said adjustable means comprising a pair of spaced openings in the base bracket, a pair of closely spaced openings in the blade bracket and an arcuate slot in the blade bracket, and fastener means extending through one of the openings in the base bracket in the arcuate slot and through the other of the openings in the base bracket and one of the pair of openings in the blade bracket,
a removable template mounted on said deflector blade and having an edge portion thereof extending in predetermined relationship along the window of the vehicle such that when the template is mounted on the deflector, the deflector can be adjusted to bring the edge portion into parallel relation to the window of the vehicle and thereby establish an optimum air flow over the window after which the template can be removed.

3. The method of mounting a wind deflector on a vehicle which wind deflector includes a wind deflector blade, at least one base bracket and adjustable means for adjusting the relationship of the wind deflector blade with respect to the bracket by using a template having a portion engaging the deflector and a straight edge portion which method comprises
mounting the base bracket on the vehicle,
positioning a template on the wind deflector blade so that the straight edge portion of the template extends along the window which is associated with the wind deflector,
adjusting the relationship of the deflector and in turn, the template so that a straight edge portion of the template is in a parallel predetermined relationship to the window, and finally fastening the wind deflector in the predetermined relationship to the base bracket.

* * * * *